Patented Nov. 20, 1951

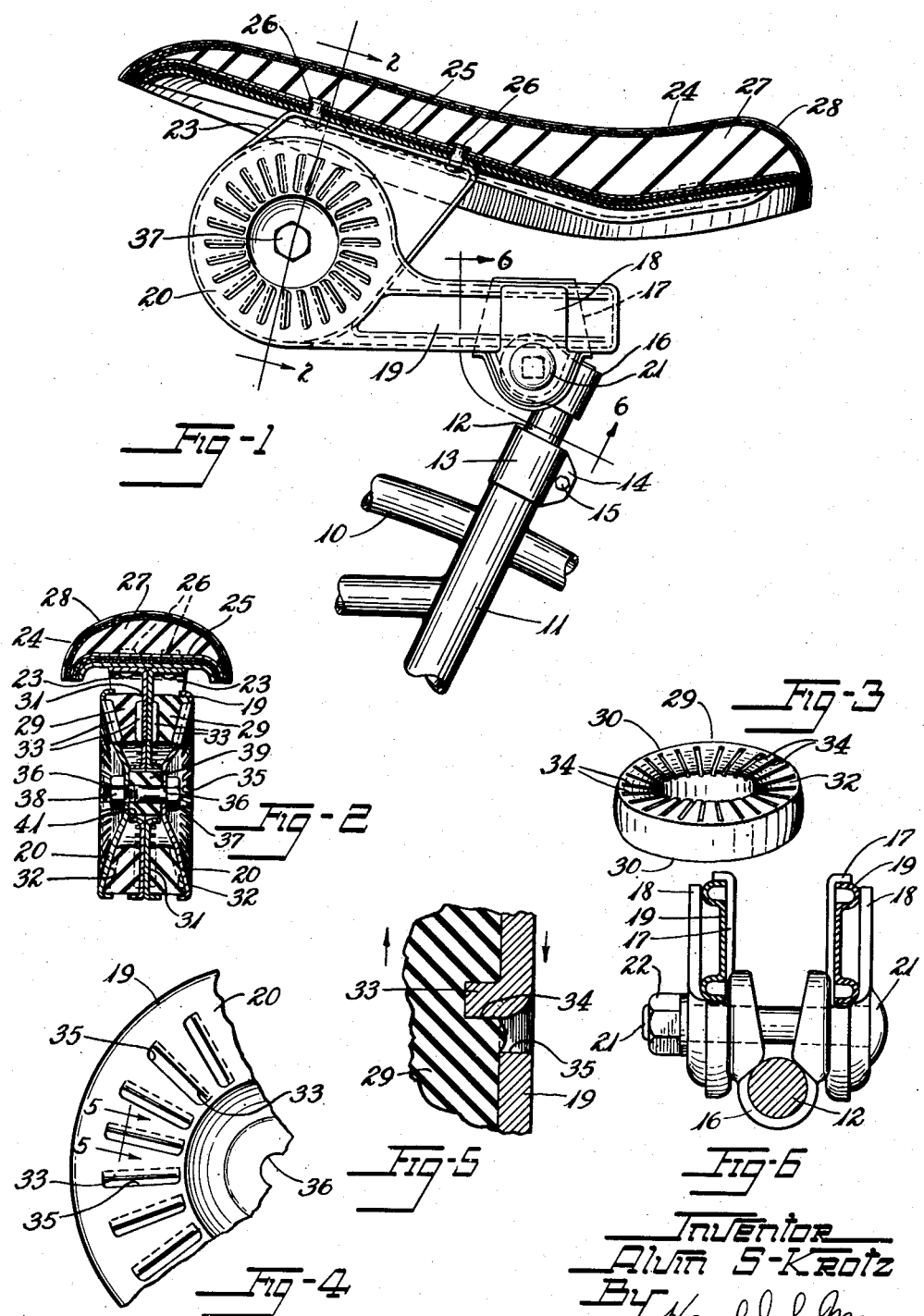

2,575,496

UNITED STATES PATENT OFFICE 2,575,496

SEAT SUSPENSION

Alvin S. Krotz, Akron, Ohio, assignor to The B. F. Goodrich Company, New York, N. Y., a corporation of New York Application January 29, 1949, Serial No. 73,465

4 Claims. (Cl. 155—5.20)

This invention relates to seat suspensions for vehicles and installations where it is desirable to cushion a seat from the vibration and erratic movements of the supporting structure. The invention is especially applicable to bicycle seats where cushioning is important because of the small amount of cushioning provided by the bicycle structure. The light weight of bicycles increases the need for adequate cushioning as bicycle structures do not have the weight necessary to absorb shocks and impacts imposed on the vehicle while traveling over rough terrain.

A seat suspension which is satisfactory for other uses may be undesirable for bicycles because the riders of bicycles use their legs to provide the propelling force and the seat suspension must be of a type to permit freedom of leg action. In addition it is necessary that the seat suspension provide sufficient support as well as cushioning of the rider.

It is further desirable that bicycle seat suspensions be adjustable to provide satisfactory cushioning for riders of all weights and sizes, as bicycles are ridden by both children and adults. Although bicycles have been used for several decades the seat suspensions provided have not been satisfactory because the seat suspensions have not provided the cushioning and freedom of movement required by the rider, whose comfort is almost entirely dependent upon the effectiveness of the seat suspension.

It is an object of this invention to provide an improved seat suspension which fully meets the above-mentioned requirements without necessitating the introduction of any undesirable characteristics.

Further objects are to provide cushioning of the seat in all directions through stressing of the cushioning body, to provide an improved mounting of the cushioning body in the suspension, to provide positive limitation of the movement of the seat, to provide cooling of the cushioning body, to provide for even distribution of the stresses in the cushioning body, to provide for quiet operation of the suspension, to provide a cushioning suspension which does not require lubrication, to provide a light weight suspension, to provide for readily adjusting the suspension to accommodate persons of different weights and to provide for simplicity and economy of construction, ease of installation and a minimum of maintenance requirements.

These and other objects will be apparent from the following description, reference being had to the drawings in which:

Fig. 1 is an elevation of a bicycle seat suspension constructed in accordance with and embodying the invention, the seat being sectioned and parts being broken away.

Fig. 2 is a section taken along line 2—2 of Fig. 1.

Fig. 3 is a view in perspective of one of the cushioning bodies of the invention.

Fig. 4 is an enlarged view of the suspension shown in Fig. 1, parts being broken away.

Fig. 5 is an enlarged section taken along line 5—5 of Fig. 4, parts being broken away.

Fig. 6 is a section taken along line 6—6 of Fig. 1.

With reference to the drawing the seat suspension of the invention is shown as applied to a bicycle seat. In Fig. 1 a conventional bicycle frame 10 is shown which is connected to the wheels, handlebars and propelling mechanism of the conventional type which are not shown. A tubular member 11 of the frame projects upward from the frame and is adapted to telescopically embrace a post 12. A collar 13 is provided at the upper end of the tubular member 11 and has ears 14, 14 which may be drawn together by a bolt 15 threaded in the ears to clamp the post 12 in the desired position. As shown in Fig. 6, collar 16 is disposed about the free end of the post 12 and has opposing flanges 17, 17 extending tangentially in parallel relationship outward from the post. Outward of the flanges 17, 17 are clamping plates 18, 18 for embracing outer members 19, 19 of the cushioning structure of the invention. A bolt 21 is inserted through aligned apertures in the flanges 17, 17 and plates 18, 18 and has a nut 22 threaded thereon for urging the plates and flanges against the members 19, 19 in clamping engagement. The members 19, 19 have a constant cross-section over a sufficient length to permit movement of the members forward and rearward between the flanges 17, 17 and plates 18, 18 upon release of the clamping pressure exerted by the bolt 21 and nut 22 for adjusting the position of the members relative to the post 12. The members 19, 19 may be fixed in the desired position by tightening the nut 22 on bolt 21 as described heretofore.

In accordance with the invention the outer members 19, 19 are mounted in opposed relationship and have opposing disc portions 20, 20 between which is disposed a supported inner member which may be composed of a pair of sheet metal stampings 23, 23 upon which is mounted a seat 24 of a conventional type. In the embodiment shown the inner members 23, 23 have flanges which are riveted to a sheet metal frame 25 of the seat 24 by rivets 26, 26.

The seat may be padded with a suitable soft material 27 such as rubber or other rubber-like material and has a covering of wear-resisting material 28 such as polyvinyl chloride or leather.

Annular cushioning bodies 29, 29, one of which is shown in Fig. 3, are clamped between the outer and inner members 19, 19 and 23, 23, but are otherwise unattached. Each body 29 has a flat face 31 and a concave face 32 providing a cushioning body with increased thickness at the radially outer portion. The disc portions 20, 20 of the outer members 19, 19 of the cushioning structure are frusto-conically shaped to conform to the shape of the cushioning bodies 29, 29.

The abutting faces of the cushioning bodies 29, 29 are connected to the inner and outer members 19, 19 and 23, 23, and relative rotation between them is prevented by suitable means. As shown in the drawing and especially in Figs. 4 and 5 the inner and outer members 19, 19 and 23, 23 have projections such as radial ribs 33, 33 which project into indentations such as radial grooves 34, 34 in the cushioning bodies 29, 29. The ribs 33, 33 may be made conveniently by shearing the members 19, 19 and 23, 23 along radial lines and turning up one edge of the resulting flaps providing the projecting ribs with adjacent apertures 35, 35 as shown in Fig. 5. The grooves 34, 34 in the cushioning bodies 29, 29 extend radially outward from the opening at the center and are preferably evenly spaced circumferentially of the body. As shown in the drawings the grooves 34, 34 preferably terminate short of radially outer edges 30, 30 providing circumferentially uninterrupted flanges at the outer periphery of the body for reinforcing the resulting rib portions between the grooves and preventing foreign matter from entering the grooves. The ribs 33, 33 are stamped in the inner and outer members 19 and 23 in corresponding positions to mesh with the grooves 34, 34 of the cushioning bodies and prevent relative rotation of the cushioning bodies and the members at their abutting faces. It is preferable that the apertures 35, 35 be located at the side of the ribs 33, 33 which must bear the thrust of the resilient material of the cushioning bodies, and as shown in Figs. 1 and 4 the apertures in the outer members 19, 19 are located in a counterclockwise direction from the ribs, as seen from the left, and the apertures in the inner members 23, 23 are located clockwise of the ribs.

Referring to Fig. 2 a connecting element such as a bolt 37 and nut 38 is disposed in apertures 36, 36 in the disc portions 20, 20 of the outer members 19, 19, for urging the outer members against the cushioning bodies 29, 29 and the cushioning bodies against the inner members 23, 23. A cylindrical bushing 39 of resilient rubber or other rubber-like material may be disposed around the bolt 37 and between the outer members 19, 19. The inner members 23, 23 may extend inwardly and terminate in flanges forming an aperture 41 through which the bushing extends and against which the bushing may bear.

In operation the weight of the cyclist is supported for the most part at the after portion of the seat 24 shown at the right in Fig. 1. Upward forces exerted on the bicycle tend to move the outer members 19, 19 toward the seat 24 and urge the inner members 23, 23 in a clockwise direction about the axis of the bolt 37 relative to the outer members 19, 19. During such movement the ribs 33, 33 and grooves 34, 34 are in meshing engagement to prevent relative movement of the abutting surfaces of the cushioning bodies and the abutting members 19, 19 and 23, 23 for stressing the cushioning bodies 29, 29 in shear. The apertures 35, 35 in the inner and outer members are preferably disposed adjacent the faces of the ribs 33, 33 which resist downward movement of the seat relative to the bicycle frame 10. This disposition of the apertures provides flat effective movement-resisting surfaces of the ribs 33, 33 to resist the relative movement of the cushioning bodies 29, 29 and the members 19, 19, and 23, 23 under the weight of the cyclist and additional vertical forces. Additional surface for resisting relative movement is obtained when the rubber-like material of the cushioning body 29 moves into the apertures 35, 35 of the members as shown in Fig. 5 upon initial axial compression of the body resulting from taking up of nut 38 on bolt 37 and upon increase of the pressure of the cushioning body against the ribs resulting from torsional movement of the members of the spring when weight rests on the seat 24.

The cushioning bodies 29, 29 have greater axial thickness at the radially outer edges 30, 30 which equalizes the stress in the various portions of the body. This construction also permits some sidewise tilting of the seat 24 without contact of the inner and outer members 23, 23 and 19, 19.

The bushing 39 disposed about the bolt 37 prevents contact of the bolt with inner members 23, 23 which might occur during imposition of an excessive load upon the spring assembly. The bushing 39 further serves to carry part of the radial forces exerted upon the cushioning bodies 29, 29 and in this way aids in equalizing the loads carried by the rib portions between the grooves 34, 34.

Provision has been made for the safety of the rider at all times, providing ample support under normal loads and even under excessive loads which may cause failure of the cushioning bodies 29, 29. If such excessive load should cause failure of the bodies 29, 29 the cyclist would not be thrown from the bicycle due to the fact that the seat 24 would descend only until it bottoms on the outer members 19, 19 of the spring structure which are rigidly mounted on the bicycle frame 10 and which provide ample support.

The seat suspension of the invention is easily adaptable for carrying riders of different weights. To adjust the seat for carrying a person of greater weight it is only necessary to loosen the nut 38 on bolt 37 and in some cases the nut 22 on the bolt 21 to spread the outer members 19, 19 whereupon the inner members 23, 23 may be moved out of engagement with the cushioning bodies 29, 29 and be moved counter-clockwise as seen in Fig. 1 to another position at which the ribs 33, 33 mesh with the grooves 34, 34. Then the nuts 22 and 38 may be tightened on the bolts 21 and 37 to return the outer members 19, 19 to their former position. This adjustment causes the no-load position of the seat 24 to be higher and the loaded position to remain the same. If desired, conventional limiting means such as stops may be used to maintain the same no-load position after adjustment.

To adjust the suspension for riders of lesser weight the procedure is substantially the same. The outer members 19, 19 are spread apart and the inner members 23, 23 moved in a clockwise direction as seen in Fig. 1 relative to the outer member and cushioning bodies 29, 29 until the grooves 34, 34 and ribs 33, 33 are brought into alignment whereupon the outer members 19, 19 are urged toward each other again. It is obvious that the same results can be obtained by disengaging the outer members 19, 19 from the cushioning bodies 29, 29 and by moving the inner members 23, 23 and cushioning bodies together relative to the outer members.

Adjustments are provided for different size riders in that the seat 24 may be raised or lowered by raising or lowering the post 12 in the tubular member 11 and may be held at any position by tightening the collar 13 with bolt 15. The seat may be moved forward or rearward by loosening the nut 22 on bolt 21 and sliding the outer members 19, 19 forward or rearward between the flanges 17, 17 and clamping plates 18, 18 to the desired position where the seat may be secured by tightening the nut 22 on bolt 21.

In addition to cushioning the seat 24 from vertical forces through shear of the cushioning bodies 19, 19 the cushioning bodies cushion forces from other directions in shear and compression and along with bushing 39 provide a suspension in which the seat 24 is separated from the bicycle frame 10 by resilient rubber-like material and in which there is no connection of substantially rigid material between the seat 24 and frame 10.

Variations may be made without departing from the scope of the invention as it is defined in the following claims.

I claim:

1. A cycle seat suspension for cushioning relative movement of a supporting cycle structure and a supported seat structure comprising a pair of frustro-conical shaped members in spaced-apart coaxial relationship for mounting on one of the structures, a connecting element extending between the members of said pair and mounted thereon for limiting relative spreading movement of the members of said pair, an arm member extending between the members of said pair and around said connecting element for mounting on the other of the structures, and annular bodies of resilient rubber-like material interposed between the arm member and the members of said pair and disposed around said connecting element for cushioning relative turning movement of said arm member and the members of said pair in shear, each of said annular bodies having a greater thickness at the radially outer portion than at the radially inner portion and having grooves extending radially outward and said arm member and the members of said pair having ribs extending radially outward in meshing engagement with said grooves and having apertures adjacent said ribs.

2. A cycle seat suspension for cushioning relative movement of a supporting cycle structure and a supported seat structure comprising a pair of members in spaced-apart relation for mounting on one of said structures, a connecting element mounted on said members for limiting spreading movement of the members of said pair, an arm member extending between the members of said pair and around said connecting element for mounting on the other of said structures, a bushing of resilient rubber-like material interposed between said arm member and said connecting element for resiliently limiting relative radial movement thereof, and cushioning bodies of resilient rubber-like material interposed between said arm member and the members of said pair for cushioning relative turning movement of said arm member and the members of said pair in shear, said cushioning bodies of rubber-like material having grooves extending radially outward and said arm member and the members of said pair having ribs in meshing engagement with said grooves in said cushioning bodies and having apertures adjacent said ribs.

3. A cycle seat suspension for cushioning relative movement of a supporting cycle structure and a supported seat structure comprising a pair of frustro-conical shaped members in spaced-apart coaxial relationship for mounting on one of the structures, a connecting element extending between the members of said pair and mounted thereon for limiting relative spreading movement of the members of said pair, an arm member extending between the members of said pair and around said connecting element for mounting on the other of the structures, a bushing of resilient rubber-like material interposed between said arm member and said connecting element for resiliently limiting relative radial movement thereof, and cushioning bodies of resilient rubber-like material interposed between said arm member and the members of said pair for cushioning relative turning movement of said arm member and the members of said pair in shear, said cushioning bodies of rubber-like material having grooves extending radially outward and said arm member and the members of said pair having ribs in meshing engagement with said grooves in said cushioning bodies and having apertures adjacent said ribs.

4. A cycle seat suspension for cushioning relative movement of a supporting cycle structure and a supported seat structure comprising a pair of members in spaced-apart relation for mounting on one of said structures, a connecting element mounted on said members for limiting spreading movement of the members of said pair, an arm member extending between the members of said pair and around said connecting element for mounting on the other of said structures, a bushing of resilient rubber-like material interposed between said arm member and said connecting element for resiliently limiting relative radial movement thereof, and cushioning bodies of resilient rubber-like material interposed between and attached to said arm member and the members of said pair for cushioning relative turning movement of said arm member and the members of said pair in shear.

ALVIN S. KROTZ.

REFERENCES CITED

The following references are of record in the file of this patent:

UNITED STATES PATENTS

| Number | Name | Date |
|---|---|---|
| 2,300,379 | Faulhaber | Oct. 27, 1942 |
| 2,476,226 | Schwinn | July 12, 1949 |